United States Patent [19]

Szabó et al.

[11] Patent Number: 5,233,182

[45] Date of Patent: Aug. 3, 1993

[54] METHOD AND APPARATUS FOR THE ACQUISITION OF DATA FOR DETERMINING THE DURATION AND CHIRP OF ULTRASHORT LASER PULSES

[75] Inventors: Gábor Szabó, Szeged, Hungary; Alexander Mueller, Goettingen, Fed. Rep. of Germany; Zsolt Bor, Szeged, Hungary

[73] Assignee: Max-Planck-Gesellschaft zur Foerderung der Wissenschaften e.V., Fed. Rep. of Germany

[21] Appl. No.: 729,070

[22] Filed: Jul. 12, 1991

[30] Foreign Application Priority Data

Jul. 20, 1990 [DE] Fed. Rep. of Germany ....... 4023175

[51] Int. Cl.$^5$ ......................... H01J 31/50; H01S 3/10
[52] U.S. Cl. ................. 250/214 VT; 372/25
[58] Field of Search ................. 250/213 VT; 356/218, 356/222, 5; 372/25

[56] References Cited

U.S. PATENT DOCUMENTS

| | | | |
|---|---|---|---|
| 3,641,343 | 2/1972 | Langer | 250/213 VT |
| 4,327,285 | 4/1982 | Bradley | 356/213 |
| 4,681,436 | 7/1987 | Ching et al. | 356/222 |
| 4,972,423 | 11/1990 | Alfano et al. | 372/25 |
| 5,068,525 | 11/1991 | Schaefer et al. | 250/213 VT |

OTHER PUBLICATIONS

"Dynamic Spectroscopy and Subpicosecond Pulse Compression", Applied Physics Letters, vol. 27, No. 9, Nov. 1975, E. P. Ippen et al.
Applied Optics, vol. 24, No. 9, May 1, 1985, Diels et al., pp. 1270-1282; Control and Measurement of Ultrashort Pulse Shapes (in Amplitude and Phase) With Femiosecond Accuracy.
Optics Letters, Sep. 1988, vol. 13, No. 9, pp. 746-748 Szabo, et al.: Phase-Sensitive Single-Pulse Autocorrelator for Ultrashort Laser Pulses.
IEEE Journal of Quantum Electronics, vol. QE-5, No. 9, Sep. 1969, pp. 454-458 Edmond B. Treacy; Optical Pulse Compression With Diffraction Gratings.
Lasers Univ. Science Books, Mill Valley, Calif. USA 1986, pp. 330-351 A. E. Sigman: Linear Pulse Propagation.
J. Optc. Soc. Am. A/vol. 1, No. 10/Oct. 1984 O. E. Martinez, et al.: Negative Group-Velocity Dispersion Using Refraction.
Applied Physics B 31, 1-4 (1983) pp. 1-4, G. Szabo, et al.: Amplification and Measurement of Single 1.6-3.5 PS Pulses Generated by a Distributed Feedback Dye Laser.

*Primary Examiner*—Davis L. Willis
*Assistant Examiner*—Hoa Q. Pham
*Attorney, Agent, or Firm*—Nields & Lemack

[57] ABSTRACT

For the acquisition of data for determining the duration and chirp (frequency modulation) of a single ultrashort laser radiation pulse said pulse is split into two partial pulses which are each conducted through one of two TREACY compressors having different group delay dispersions and then recorded in succession on the same time basis with a streak camera.

9 Claims, 4 Drawing Sheets

Experiment No 1

Experiment No 2

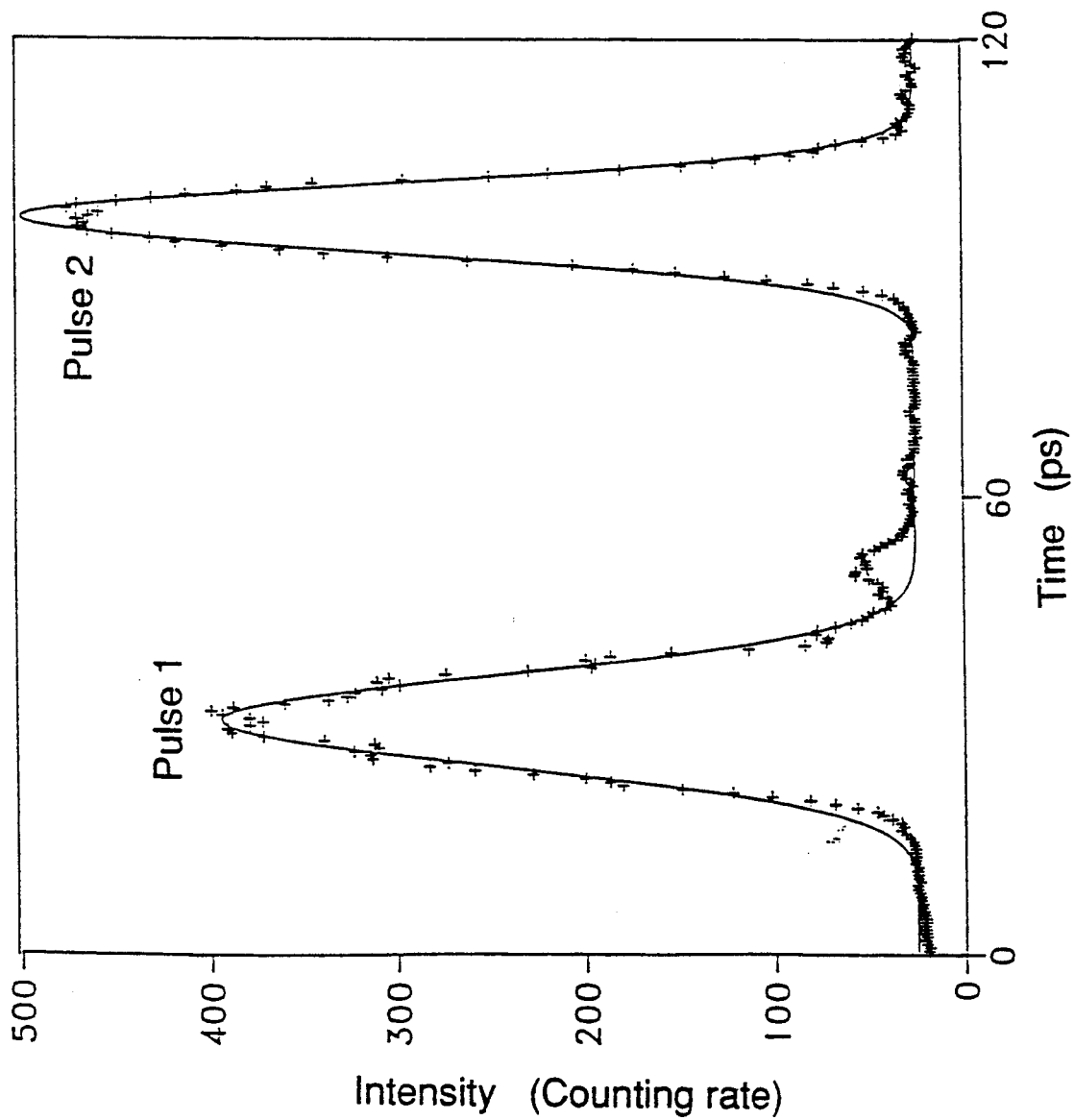

METHOD AND APPARATUS FOR THE ACQUISITION OF DATA FOR DETERMINING THE DURATION AND CHIRP OF ULTRASHORT LASER PULSES

BACKGROUND OF THE INVENTION

1. Field of the Invention

The present invention relates to a method and an apparatus for the acquisition of data for determining the duration and frequency modulation ("chirp") of a single ultrashort pulse in the optical spectral range as can be generated for example with a distributed feedback dye laser or a phase-locked dye laser with simultaneous use of frequency-changing and intensifying components and dispersing optical elements.

2. Description of the Related Art

The determination of the frequency modulation ("chirp") of ultrashort pulses, in particular of pulses having a duration in the picosecond (ps) and femtosecond (fs) range, was hitherto possible only with the aid of the socalled interferometric autocorrelation method of the second order, both by the multiple pulse process (Diels, Fontaine, McMichael and Simoni, Appl. Opt. 24, 1270 (1985)), and by the single pulse process (Szabo, Bor and Müller, Opt. Lett. 13, 746 (1988)). However, these methods permit only the determination of chirps of pulses with values of $\alpha \geq 3 \ldots 4$ (cf. equation 15a below).

From the publication by Treacy, IEEE J. Quant. Electron. QE-5, 454 (1969), an apparatus generally referred to as TREACY compressor is known for compression (shortening) optical radiation pulses, the mode of operation of which can be described by the following relationship:

$$1/\mu = -\frac{d^2 \cdot \omega_0^3}{4 \cdot \pi^2 \cdot c \cdot l'} \cdot \left[1 - \left[\frac{2 \cdot \pi \cdot c}{d \cdot \omega_0} - \sin\gamma\right]^2\right]^{3/2} \quad (1)$$

Herein, $\mu$ is the parameter defining the group delay dispersion, l the perpendicular centre distance between the two diffraction gratings (the double passage employed here through the TREACY compressor is taken into account by the factor 2: $l'=2.l$), d is the grating constant, c the velocity of light, $\omega_0$ the carrier frequency of the optical pulse and $\gamma$ the angle of incidence, measured between the incident ray and the grating normal.

SUMMARY OF THE INVENTION

An object of the invention is to permit the acquisition of data for determining the duration and the chirp (frequency modulation) of a single optical pulse in a laser shot.

To achieve this object the invention proposes in a method according to an embodiment of the invention for the acquisition of data for determining the duration and the chirp of a single optical radiation pulse the improvement in which the radiation pulse is split into a first and a second partial pulse, the partial pulses are conducted through a first and a second of two devices with different group delay dispersions and the partial pulses are then subsequently recorded with the same time scale.

An apparatus according to an embodiment of the invention for the acquisition of data for determining the duration and the chirp of a single optical radiation pulse comprises an input beam divider for dividing an optical input pulse into two partial pulses, an optical device having a predetermined first group delay dispersion in the beam path of the first partial pulse, an optical device having a predetermined second group delay dispersion, different from the first, in the beam path of the second partial pulse, and a means for separate registration of the partial pulses with the same time base after said partial pulses have passed through the optical devices.

The present method and the present apparatus make it possible to determine the complex Gaussian parameter $\Gamma_0$ of an ultrashort optical pulse defined in the relationship (4) given below in a single laser shot. On suitable choice of the parameters of the TREACY compressors a pulse extension is effected. It is therefore also possible to measure pulses having a duration which is shorter than the time resolving power of the streak camera employed. Hitherto, for this range only the aforementioned autocorrelation methods of the second order were available.

The invention can be applied in the entire spectral range of photocathode sensitivity of the streak camera. In contrast, the autocorrelation method of the second order is restricted to the spectral range in which due to the necessary frequency doubling electrooptical detectors can still be employed.

In contrast to interferometric autocorrelation methods of the second order with the aid of the method described here the sign of the chirp (up or down chirp) can also be determined, i.e. the direction of the frequency change.

In contrast to the known interferometric correlation methods of the second order the method set forth here also permits small chirps to be determined ($\alpha \approx 1$).

BRIEF DESCRIPTION OF THE DRAWINGS

Hereinafter the invention will be explained in detail with reference to the drawings, wherein:

FIGS. 3 and 4 show measurement results for pulses with small or larger chirp which were obtained with the apparatus according to FIG. 1.

DESCRIPTION OF THE PREFERRED EMBODIMENTS

Figure 1:
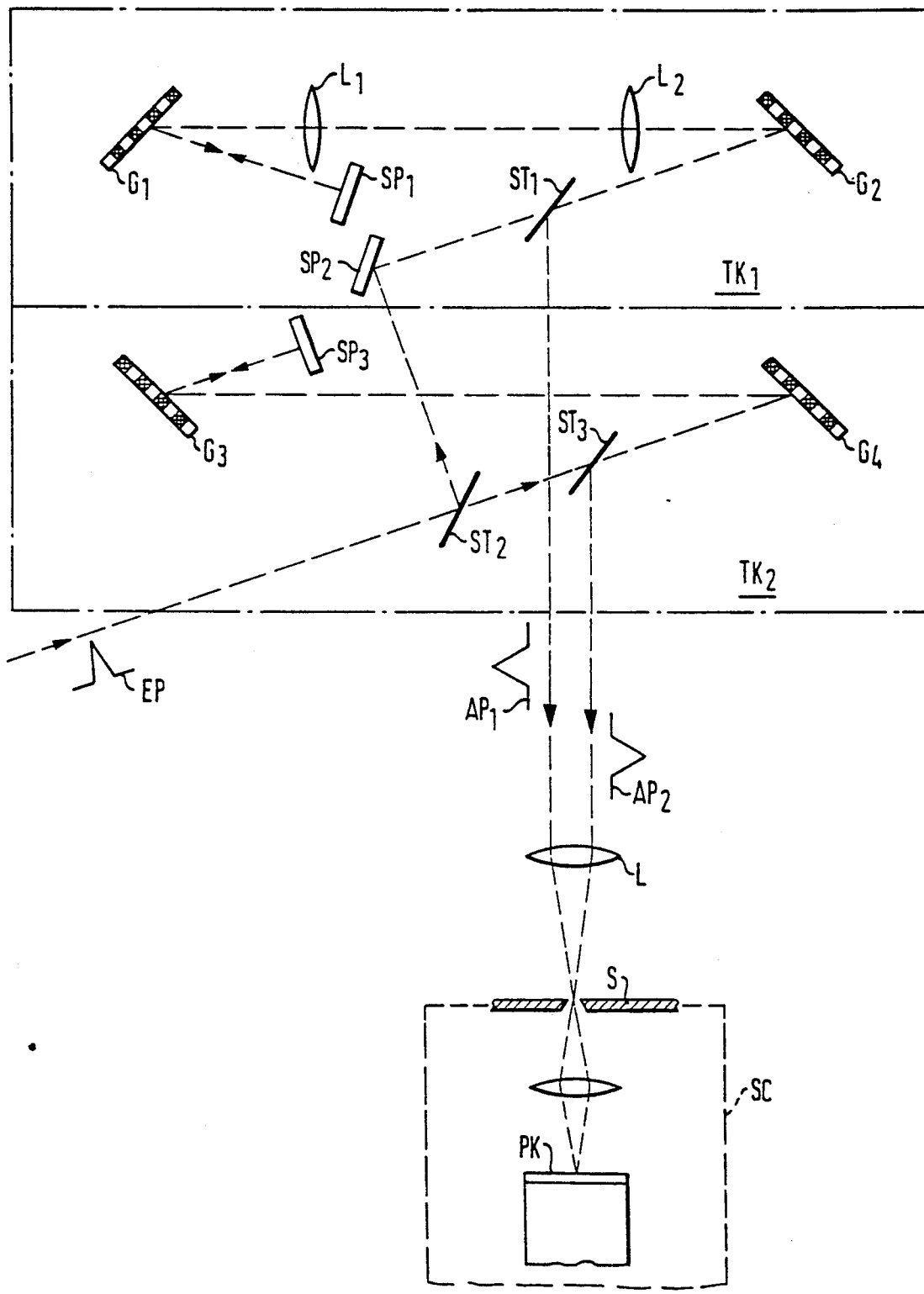
FIG. 1 shows a schematic illustration of an example of embodiment of an apparatus according to the invention.

As FIG. 1 shows, in the method according to the invention an optical input pulse EP, the duration and chirp (frequency modulation) of which is to be measured, is first split by a beam divider $ST_2$ into two partial pulses of approximately the same intensity. These then pass each in double passage through two diffraction grating arrangements $G_1$, $G_2$ and $G_3$, $G_4$, which form socalled TREACY compressors $TK_1$ and $TK_2$. After the passage, two output pulses of approximately the same intensity are coupled out of the beam paths with the aid of two beam dividers $ST_1$ and $ST_3$ in two parallel extending beam paths and imaged through an achromatic optical system L, which for simplicity is shown as a lens, on a gap S which in turn is imaged on the photocathode PK of a streak camera SC of high time resolution. Different distances of the two TREACY compressors $TK_1$, $TK_2$ from the gap S effect a time separation of the two output pulses $AP_1$, $AP_2$ so that they can be represented on the screen of the streak camera separate from each other on the same time basis and can be recorded with the aid of an electronic recording means and a following laboratory computer.

The mode of operation of a TREACY compressor on an optical pulse can be described in the following manner (cf. for example A. E. Siegmann: "Lasers", University Science Books, Mill Valley, Calif., U.S.A. (1986), cap. 9):

An optical input pulse with Gaussian envelope and linear frequency modulation or chirp will be assumed. The electrical field intensity of such a pulse can be represented by the relationship $$E(t) = \exp(-a_0 \cdot t^2) \cdot \exp(i \cdot (\omega_0 \cdot t + b_0 \cdot t^2)) \quad (2)$$

or $$E(t) = \exp(-\Gamma_0 \cdot t^2) \cdot \exp(i \cdot \omega_0 \cdot t) \quad (3)$$

In this $$\Gamma_0 = a_0 - i \cdot b_0, \quad (4)$$

the socalled complex Gaussian parameter of the pulse.

The intensity of the pulse is given by $$I(t) = |E(t)|^2 = \exp(-2 \cdot a_0 \cdot t^2) \quad (5)$$

From this there follows for the relationship between the duration $\tau_p$ (half value width) of the pulse and the parameter $a_0$:

$$\tau_p = \sqrt{(2 \cdot \ln 2 / a_0)} \quad (6)$$

The parameter $b_0$ depends on the instantaneous frequency $\omega_1$ of the wave train forming the pulse in the following manner:

$$\omega_1(t) = \omega_0 + 2 \cdot b_0 \cdot t \quad (7)$$

A Gaussian pulse having a non-vanishing imaginary component $b_0$ of the complex Gaussian parameter accordingly has a frequency changing linearly in dependence upon the time, a socalled linear chirp. The parameter $b_0$ is thus a measure of this chirp, that is the frequency deviation.

On passage of a pulse through a TREACY compressor the complex Gaussian parameter of the pulse changes and the result obtained is $$1/T = 1/T_0 + 2 \cdot i / \mu \quad (8)$$

Substitution of (4) in (8) leads to $$\Gamma' = \frac{a_0}{\left(1 + \frac{2b_0}{\mu}\right)^2 + \left(\frac{2a_0}{\mu}\right)^2} - \quad (9)$$

$$i \cdot \frac{\frac{2a_0^2}{\mu} + b_0\left(1 + \frac{2b_0}{\mu}\right)}{\left(1 + \frac{2b_0}{\mu}\right)^2 + \left(\frac{2a_0}{\mu}\right)^2}$$

or $$\Gamma' = a_1 - i \cdot b_1, \quad (10)$$

wherein $$a_1 = \frac{a_0}{\left(1 + \frac{2b_0}{\mu}\right)^2 + \left(\frac{2a_0}{\mu}\right)^2} \quad (11)$$

and $$b_1 = \frac{\frac{2a_0^2}{\mu} + b_0\left(1 + \frac{2b_0}{\mu}\right)}{\left(1 + \frac{2b_0}{\mu}\right)^2 + \left(\frac{2a_0}{\mu}\right)^2} \quad (12)$$

By the choice or various parameters in (1) TREACY compressors can be made up which differ in their square phase terms $\mu$: $\mu_2 \neq || 1$. To obtain the highest resolving power in the use described here it is expedient to choose specifically $\mu_2 = -\mu_1$. From the publication of Martinez, Gordon and Fork, J. Opt. Soc. Am. A1, 1003 (1984) it is known that the sign of $\mu$ can be reversed by inserting a suitably dimensioned beam expansion telescope into a TREACY compressor, as is done here by inserting two achromats $L_1$ and $L_2$ illustrated as lenses into the beam path of $TK_1$.

If a laser pulse with unknown parameters $a_{00}$ and $b_{00}$ is allowed to pass through the arrangement shown in FIG. 1 and with the aid of the streak camera the durations $\tau_{11}$ and $\tau_{12}$ of the pulses modified by the TREACY compressors $TK_1$ and $TK_2$ (see FIG. 2) are determined, the parameters $a_{11}$ and $a_{12}$ can then be found therefrom by analogous applications of (6).

For the case assumed here $\mu = \mu_2 = |-\mu_1|$, the following analytical solution may be given $$a_{00} = \frac{1 + \sqrt{\{1 - (D/S)^2 - [(8 \cdot P)/(S \cdot \mu)]^2\}}}{D^2/(4 \cdot P \cdot S) + (16 \cdot P)/(S \cdot \mu^2)} \quad (13)$$

$$b_{00} = -a_{00} \cdot (D \cdot \mu)/(8 \cdot P) \quad (14)$$

wherein $S = a_{11} + a_{12}$ and $D = a_{11} - a_{12}$ and $P = a_{11} \cdot a_{12}$.

If $\mu_1$ and $\mu_2$ are different, by applying (11) two equations can be obtained for the two unknown quantities $a_{00}$ and $b_{00}$ and can be solved with numerical standard methods.

Hereinafter an example of embodiment of the apparatus according to FIG. 1 will be explained in detail as well as the measuring method according to the invention with the aid of two examples:

To generate the input pulse EP to be measured a laser system was used comprising a distributed feedback dye laser pumped by means of a phase-locked ND:YAG laser and following dye laser amplifier stages, similar to the system known from the publication of Szabo, Bor and Müller, Appl. Phys. B 31, 1 (1983).

The dye laser wavelength in the present case was tuned to 604 nm. The laser system furnished single pulses having an energy of 5 $\mu J$ which for the measurement were attenuated by neutral density filter having a transmission of $10^{-3}$. By simultaneous measurements of the pulse duration with the aid of a 2-ps streak camera and the spectral bandwidth of the laser pulses with a high-resolution grating spectrograph it was found that almost bandwidth-limited approximately Gaussian pulses of about 2 ps duration were generated. $ST_{1,2,3}$ were 50% beam divider mirrors. $SP_{1,2,3}$ were aluminium surface mirrors with maximum reflection. For the parameters of the TREACY compressors $TK_1$ and $TK_2$ the following values were chosen (meaning of the symbols as above):

$TK_1$:
$l_{12} = 1450$ mm
$d^{-1} = 2400$ mm$^{-1}$ ($G_1$ and $G_2$)
$\omega_0 = 3.119 \cdot 10^{15}$ s$^{-1}$ ($\rightarrow \lambda_0 = 604$ nm)
$\gamma = 1027$ mrad focal length of the two achromats $L_1$ and $L_2$ of the telescope: $f_1 = f_2 = 600$ mm; according to Martinez, Gordon and Fork, (1984), loc. cit., in this case in (1) instead of the effective grating spacing is to be inserted and is defined by $l_{eff} = [l_{12} - 2(f_1 + f_2)] \cdot (f_1/f_2)^2 = 950$ mm.

This consequently gives $\mu_1 = 0.12$ ps$^{-2}$ $TK_2$:
$l_{34} = 1000$ mm
$d^{-1} = 2400$ mm$^{-1}$ ($G_3$ and $G_4$)
$\omega_0 = 3,119 \cdot 10_{15}$ s$^{-1}$ ($\rightarrow \lambda_0 = 604$ nm)
$\gamma = 1027$ mrad This therefore gives $\mu_2 = -0.12$ ps$^{-2}$.

$SP_1$ was disposed on a linear displacement means to enable the light path defining the time separation of the output pulses to be varied.

In the present example a Hamamatsu C-1370-01 streak camera having a time resolving power of 2 ps was used to record the pulses.

Figure 2:
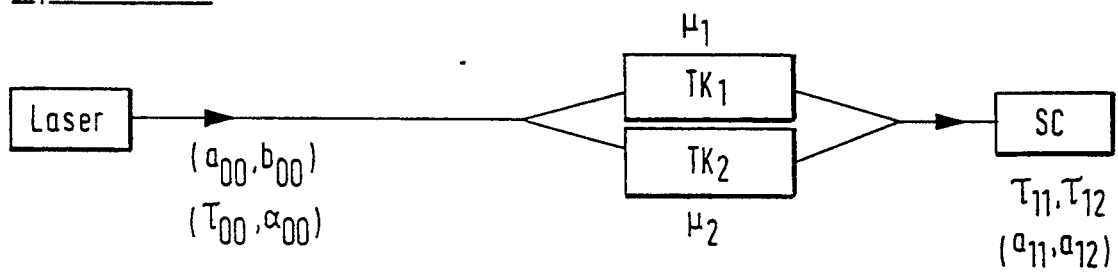
FIG. 2 shows schematic illustrations of two experiments and the parameters employed.
Figure 2:
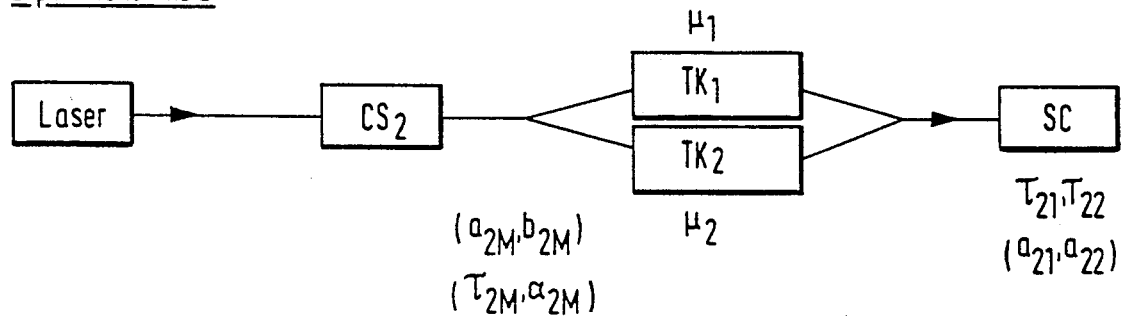

A schematic view of the experiments and the designation of the parameters is given in FIG. 2.

Figure 3:
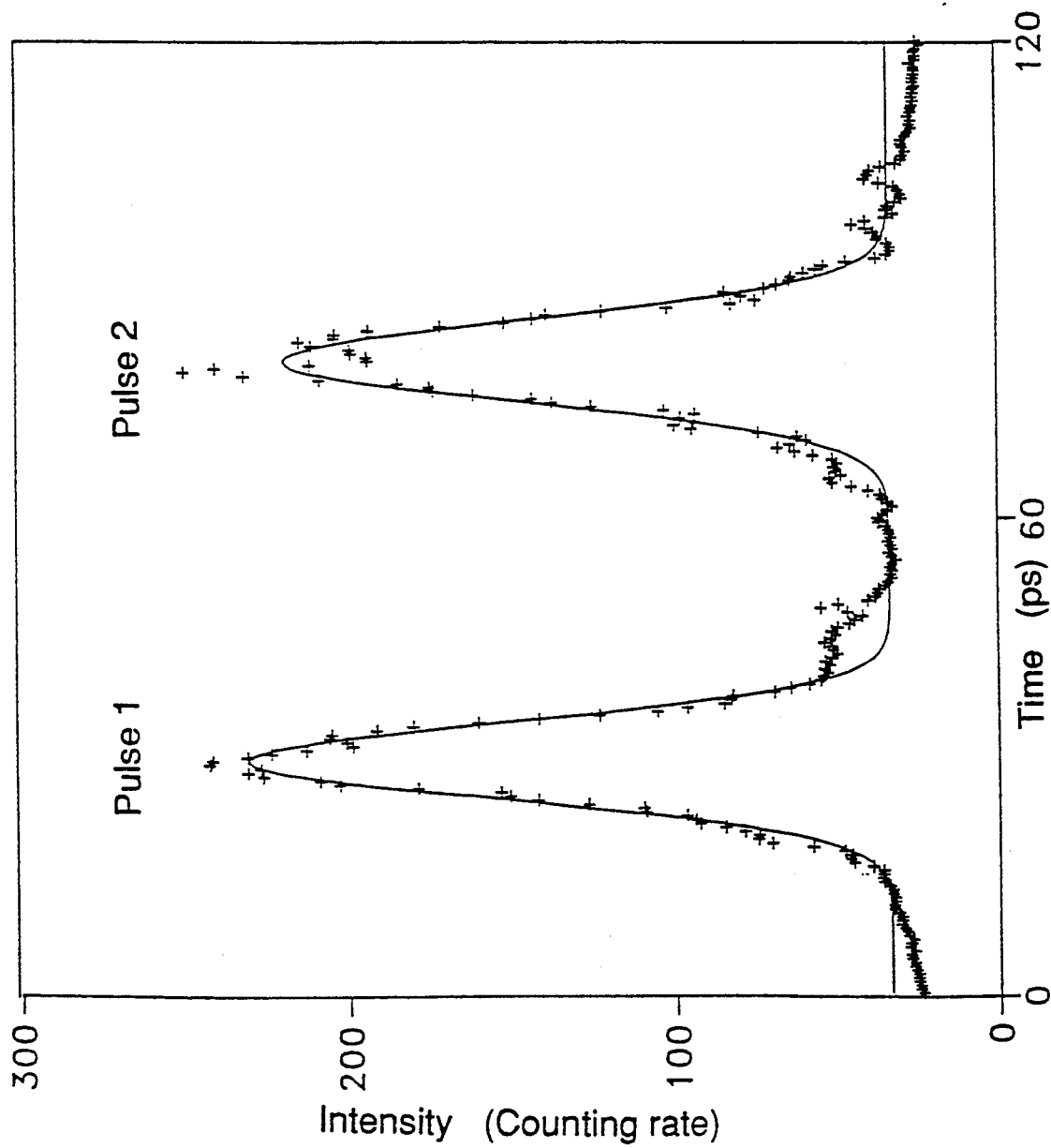

FIG. 3 shows a typical example of the laser pulses recorded with this arrangement. The crosses represent the experimental data. The full line represents Gaussian curves adapted with the aid of the Levenberg-Marquardt method.

The adaptation provides the half value widths:
$\tau_{11} = 11.2$ ps (pulse 1) and $\tau_{12} = 12.1$ ps (pulse 2).
Using (6), it follows therefrom that:
$a_{11} = 1.11 \cdot 10^{-2}$ and $a_{12} = 9.47 \cdot 10^{-3}$ ps$^{-2}$,
which corresponds to a duration of the input pulse of $\tau_{00} = 2.1$ ps.

Generally (cf. Siegman, loc. cit.) the socalled time-bandwidth product is used to characterize ultrashort pulses. The following holds true for a Gaussian pulse:

$$\delta f_p \cdot \tau_p = (2 \cdot \ln 2/\pi) \cdot \sqrt{(1 + (b/a)^2)} \qquad (15)$$
$$= (2 \cdot \ln 2/\pi) \cdot \alpha \qquad (15a)$$

wherein $\delta f_p$ is the bandwidth of the frequency spectrum linked to the pulse of the half width $\tau_p$. In the case where the pulse is free of chirp, i.e. exhibits no frequency modulation, $b = 0$ or $\alpha = 1$, and the time-bandwidth product assumes a minimum value of $2 \ln 2/\pi = 0.44$.

In the case of the experiment represented above the root term in (13) has the value $\alpha_{00} = 1.03$, i.e. the time-bandwidth product exceeds the minimum value by only 3%. The pulse accordingly has only a very small chirp (frequency modulation).

A second example will be used to illustrate the measurement of a pulse having a considerable chirp. To generate the chirp a pulse of the type described in the first example is sent through a medium of high dispersion before being supplied to the measuring device.

As suitable medium, carbon disulfide ($CS_2$) was chosen and was introduced into a glass cuvet of 1.5 mm length. To intensify the effect the pulse was sent through this cuvet twice by means of a deflection mirror arrangement.

FIG. 4 shows a typical measurement result which was obtained with the arrangement shown in FIG. 1. The Gaussian curve adaptation furnishes here the following values for the half widths:
$\tau_{21} = 13.9$ ps (pulse 1) and $L_{22} = 10.4$ ps (pulse 2).
Corresponding to
$a_{21} = 7.18 \cdot 10^{-3}$ ps$^{-2}$ and $a_{22} = 1.28 \cdot 10^{-2}$ ps$^{-2}$.

In this case, as solutions $a_{2M} = 2.02 \cdot 10^{-1}$ ps$^{-2}$ and $b_{2M} = 1.28 \cdot 10^{-2}$, these values corresponding to $\tau_{2M} = 2.6$ ps and $\alpha_{2M} = 1.36$. Accordingly, in this case the time-bandwidth product exceeds the minimum value by 36%. As expected, this pulse has a considerable chirp (frequency modulation).

A comparison of the results obtained from FIGS. 3 and 4 with values calculated on the basis of the dispersion of $CS_2$ exhibited good coincidence. On suitable choice of the parameters denoting the TREACY compressors a pulse lengthening is effected. It is therefore possible to measure pulses having a duration which is shorter than the time resolving power of the streak camera used. Hitherto, for this range only the aforementioned autocorrelation methods of the second order were available.

In the present case the detection sensitivity was 5 nJ. It can be increased by at least one order of magnitude by using prismatic TREACY compressors instead of the grating arrangements used here so that the direct investigation of the pulses of typical continuous phase-locked dye lasers is possible.

The method is not restricted to the analysis of Gaussian pulses, only the mathematical method is relatively simple and clear for such pulses. As FIGS. 3 and 4 show, the Gaussian form represents a good approximation for the pulses generated by the laser system used. For other pulse shapes it might not be possible to give any analytical solutions; numerical methods will then have to be used.

Resolving power of the measuring method:
By suitable choice of the parameters in (1) $\mu$ may be set so that the pulses to be measured are widened to 5 . . . 15 ps. The parameters of the TREACY compressors are all well accessible to the measurement and can be determined with adequate accuracy, and consequently the accuracy is practically not limited thereby.

The accuracy of the measuring method is however limited by the streak camera having only a limited time resolving power. If for example a streak camera of is assumed resolving a relative measurement error of, time differences of $\Delta \tau = 300$ fs may be resolved. It should be possible to increase this resolution to twice that amount for example by repeated measurements and averaging, which would accordingly enable time differences of only 150 fs to be measured. The use of more modern streak cameras having a resolving power of $\leq 600$ fs promises further possibilities of improvement.

A practical definition of the resolving power must take joint account of the pulse duration and chirp. If a predetermined pulse duration is assumed at the output of $TK_1$, for example $\tau_1 = 5$ ps, then in the light of (13) and (14), with the further assumptions for example $\Delta \tau = 300$ fs and $\mu = 1$ ps$^{-2}$, both the shortest measurable pulse duration $\tau_{min}=560$ fs and $\alpha_{min}=1.04$ (cf. (15a)) are fixed through the time-bandwidth product.

The group delay dispersion $\mu$ of a TREACY compressor depends on the grating constant d, the grating spacing l and the angle of incidence $\gamma$. For $\mu/b_{00} > -1$ a lengthening of the pulse duration results.

The principle of the TREACY compressor can also be implemented with prisms instead of gratings. The term "TREACY compressors" is thus intended here to include such optical devices containing prisms.

A prism arrangement with which a negative group velocity dispersion can be achieved is for example described in the book by A. E. Siegman (loc. cit.), p. 350.

As optical devices for generating different group delay dispersions the socalled Gires-Tournois interferometer may also be used (Siegman, loc. cit., p. 348, 349), or quite generally dispersive media such as glass fibres or liquids. The TREACY compressor described has however the advantage that practically any desired values of the group delay dispersion with any desired sign can be implemented without difficulty in a very wide spectral range.

What is claimed is:

1. Method for the acquisition of data for determining the duration and chirp of a single optical radiation pulse, comprising the following steps:
   a) splitting the radiation pulse into a first and a second partial pulse,
   b) conducting said first partial pulse through a first device having a first group delay dispersion and conducting said second partial pulse through a second device having a different group delay dispersion and
   c) subsequently recording the partial pulses with the same time scale.

2. Method according to claim 1, characterized in that the partial pulses are recorded in method step c) in succession on the same time basis.

3. Apparatus for the acquisition of data for determining the duration and the chirp of a single optical radiation pulse, comprising in combination: an optical system adapted to guide light entering said system along a first beam path or along a second beam path, said system including
   a) an input beam divider ($ST_1$) for dividing an optical input pulse (EP) into a first partial pulse and a second partial pulse and for directing said first and second partial pulses into said first and second beam paths, respectively,
   b) a first optical device ($TK_1$) having a predetermined first group delay dispersion mounted in said first beam path,
   c) a second optical device ($TK_2$) having a predetermined second group delay dispersion, different from said first group delay dispersion, mounted in said second beam path, and
   d) a means (SC) for separate registration of the partial pulses ($AP_1$, $AP_2$) with the same time base after said partial pulses have passed through the optical devices ($TK_1$, $TK_2$).

4. Apparatus according to claim 3, characterized in that the optical devices are TREACY compressors.

5. Apparatus according to claim 4, characterized in that one of the TREACY compressors includes a telescope ($L_1$, $L_2$).

6. Apparatus as claimed in claim 1, wherein the group delay dispersion of said first optical device has a first sign, and the group delay dispersion of said second optical device has a second sign which is opposite to the first sign.

7. Apparatus according to claim 3, characterized in that the optical paths from the optical devices ($TK_1$, $TK_2$) to the recording means (SC) have different lengths so that the partial pulses arrive at the recording means (SC) in succession.

8. Apparatus according to claim 3, characterized in that the optical devices ($TK_1$, $TK_2$) are dimensioned for a lengthening of the duration of the partial pulses.

9. Apparatus according to claim 3, characterized in that the means (SC) for recording the partial pulses ($AP_1$, $AP_2$) includes a streak camera.

* * * * *